United States Patent [19]

Hogan

[11] Patent Number: 5,026,795

[45] Date of Patent: Jun. 25, 1991

[54] PROCESS FOR PREVENTING FOULING IN A GAS PHASE POLYMERIZATION REACTOR

[75] Inventor: John P. Hogan, Bartlesville, Okla.

[73] Assignee: Phillips Petroleum Company, Bartlesville, Okla.

[21] Appl. No.: 018,167

[22] Filed: Feb. 24, 1987

[51] Int. Cl.$^5$ .............................................. C08F 2/34
[52] U.S. Cl. .................................... 526/74; 526/106; 526/201; 526/901
[58] Field of Search ................. 526/74, 901, 106, 104, 526/201

[56] References Cited

U.S. PATENT DOCUMENTS

| | | | |
|---|---|---|---|
| 3,219,648 | 11/1965 | Hill | 260/93.7 |
| 3,956,252 | 5/1976 | Saeda et al. | 526/74 |
| 4,173,697 | 11/1979 | Gilbert et al. | 526/74 |
| 4,182,810 | 1/1980 | Willcox | 526/64 |
| 4,200,715 | 4/1980 | Lynch et al. | 526/88 |
| 4,220,580 | 9/1980 | Rowatt | 260/33.6 PQ |
| 4,522,987 | 7/1985 | Hogan | 526/106 |
| 4,532,311 | 7/1985 | Fulks et al. | 526/74 X |

OTHER PUBLICATIONS

O'Connor, "Processing Aids", Mod. Plas. Encyclopedia, 57(10A), 1980, pp. 226, 228.
H. S. Holappa, "Antistatic Additives", in Modern Plastics, 42(1A), 9/1964, pp. 398-400.

Primary Examiner—Fred Teskin
Attorney, Agent, or Firm—Laney, Dougherty, Hessin & Beavers

[57] ABSTRACT

A process for preventing fouling in a gas phase polymerization reactor wherein particles of polymer and/or copolymer are produced is provided. An antistatic agent is added to the polymerization zone of the reactor in an amount sufficient to substantially reduce or prevent adherence of the polymer and/or copolymer particles to the walls of the reactor and to reduce the tendency of the polymer and/or copolymer particles to agglomerate. The antistatic agent is preferably added to the polymerization zone by admixing it with a liquid carrier and introducing the resulting mixture thereto. In a continuous polymerization process wherein comonomers are copolymerized to produce particles of copolymer, the carrier used can be a liquid comonomer.

3 Claims, No Drawings

PROCESS FOR PREVENTING FOULING IN A GAS PHASE POLYMERIZATION REACTOR

BACKGROUND OF THE INVENTION

1. Field of the Invention

The present invention relates generally to gas phase polymerization processes, and more particularly, but not by way of limitation, to a process for preventing fouling of a gas phase polymerization reactor.

2. Description of the Prior Art

Many processes currently exist for the polymerization or copolymerization of one or more compounds. For example, polymers and copolymers of olefins can be produced in solution, slurry and gas phase polymerization processes.

One shortcoming of many polymerization processes is the tendency of the reactor to become fouled. The polymer particles often accumulate static charges which cause the particles to adhere or cling to the walls of the reactor. The accumulation of particles on the reactor walls results in many problems including poor heat transfer in the polymerization process. Polymer particles that adhere to the walls of the reactor continue to polymerize and often fuse together and form lumps, which can be very detrimental to a continuous polymerization process.

Various techniques have been developed to prevent or reduce reactor fouling in liquid or slurry polymerization processes. For example, U.S. Pat. No. 3,956,252 describes a method for preventing fouling in a process for the slurry polymerization of olefins. Reactor fouling is prevented by adding a nitrogencontaining salt of phytic acid or a mixture of the nitrogencontaining salt and an alkali metal salt of an organic acid to the polymerization solvent or the liquid olefin monomer. Similarly, U.S. Pat. No. 4,182,810 discloses a technique for preventing fouling in a process in which olefins are polymerized in a liquid hydrocarbon diluent. An antistatic agent is added to the liquid reaction medium.

The present invention provides a process for reducing or preventing reactor fouling in a gas phase polymerization process. Previous attempts to prevent fouling of a gas phase reactor have been unsuccessful. Although antistatic agents have been shown to reduce reactor fouling in liquid or slurry polymerization processes, they have not been used to reduce fouling in gas phase polymerization processes.

It has been thought by those skilled in the art that antistatic agents are operable only in a solid or liquid phase. An antistatic agent must contact the polymer particles directly to reduce the static charge thereof. In liquid or slurry processes, the antistatic agent can be admixed with the reaction medium. By being present in the same medium, the antistatic agent is able to contact the polymer particles directly during the polymerization process. In a gas phase polymerization process, however, there is no liquid or slurry diluent to act as a medium and carrier in which the antistatic agent can be admixed. As a result, it has been thought that antistatic agents could not be used in gas phase polymerization processes.

Surprisingly, it has now been discovered that antistatic agents can be used in gas phase polymerization processes and by the present invention, a process is provided for preventing gas phase polymerization reactor fouling using an antistatic agent.

SUMMARY OF THE INVENTION

A process for preventing fouling in a gas phase polymerization reactor wherein particles of polymer and/or copolymer are produced is provided. An antistatic agent is added to the polymerization zone of the reactor in an amount sufficient to prevent fouling of the reactor. The antistatic agent can be added continuously or intermittingly during the polymerization process. In a batch process, it can all be added at one time.

The antistatic agent is preferably added by admixing it with a liquid carrier and introducing the resulting mixture thereto. In a continuous polymerization process wherein comonomers are copolymerized to produce particles of copolymer, the antistatic agent can be admixed with a liquid comonomer and added to the polymerization zone therewith.

The antistatic agent is preferably a composition comprising a mixture of a polysulfone copolymer, a polymeric polyamine and sulfonic acid, each present in the composition in a concentration in the range of from about five to about seventy percent by weight of the composition. From the foregoing description of the present invention, it will be apparent that a principal object of the invention is to provide a process for preventing fouling during polymerization in a gas phase polymerization reactor. Numerous other objects, features and advantages of the present invention will be readily apparent to those skilled in the art upon a reading of the following disclosure including the examples provided therewith.

DETAILED DESCRIPTION OF THE PREFERRED EMBODIMENTS

In accordance with the present invention, an antistatic agent is added to the polymerization zone of a gas phase polymerization reactor in which at least one compound is polymerized in the presence of catalyst particles to produce particles of polymer and/or copolymer. The antistatic agent is added in an amount sufficient to substantially reduce or prevent adherence of the polymer and/or copolymer particles to the walls of the reactor and to reduce the tendency of the polymer and/or copolymer particles to agglomerate thereby preventing the reactor from fouling.

The process of the present invention can be used to prevent reactor fouling due to static charge of the polymer particles in any type of gas phase polymerization process. It is particularly suitable for use in a gas phase polymerization process in which a fluidized bed reactor is used. Such a process is described in U.S. Pat. No. 4,522,987, which is incorporated herein by reference.

In a gas phase olefin polymerization process utilizing a fluidized bed reactor, a stream of olefin gas is fed into the bottom of the reactor. Polymerization catalyst particles and other solid components are fluidized by the gas passing upwardly through a distribution plate into the polymerization zone of the reactor. The catalyst particles and other components can also be fluidized by mechanical means. For example, powdered catalyst and finely divided polymer can be fluidized by a stirring or agitating mechanism such as a marine-type propeller or an anchortype mixer.

The monomers and/or comonomers polymerize on the polymerization catalyst particles which are withdrawn from the fluidized bed section of the reactor. In a continuous reactor, any unpolymerized gas or vapor is withdrawn from the top of the reactor as an overhead stream and recycled back to the reactor. The gas carries much of the heat of the reaction from the reaction zone and, as a result, is often cooled before being recycled. If required, the polymer or copolymer particles can be separated from the catalyst particles by conventional techniques such as dissolution in a hot solvent and filtration of the solvent to remove the catalyst.

The antistatic agent used in accordance with the process of the present invention must be effective in a gaseous medium and must not be offensive to the polymerization catalyst employed. Preferably, the antistatic agent used is a composition comprising a mixture of a polysulfone copolymer, a polymeric polyamine and sulfonic acid. The composition preferably consists of from about 5% to about 70% by weight polysulfone copolymer, from about 5% to about 70% by weight polymeric polyamine and from about 5% to about 70% by weight sulfonic acid. Of course, the total weight percent of the composition cannot exceed 100. For example, if the composition includes 30% by weight polysulfone copolymer and 40% by weight polymeric polyamine, then it can only include 30% by weight sulfonic acid. The preferred composition of the present invention is described in U.S. Pat. No. 4,182,810, which is incorporated by reference herein.

The antistatic agent can be diluted with any solvent that does not substantially interfere with the polymerization process. When so diluted, the composition preferably includes from about 5% to about 25% by weight polysulfone copolymer, from about 5% to about 25% by weight polymeric polyamine, from about 5% to about 30% by weight sulfonic acid and the rest solvent.

The polysulfone copolymer of the composition is preferably a linear polymer having a 1 to 1 molar ratio of olefin units and sulfur dioxide units. A suitable polysulfone copolymer is 1-decene polysulfone. The 1-decene polysulfone preferably has an inherent viscosity ranging from about 0.04 dl/g to about 1.6 dl/g. The inherent viscosity is most preferably about 0.05 dl/g. The viscosity values are obtained by measuring a 0.5% by weight solution of 1-decene polysulfone in toluene at 30° C.

The polymeric polyamine of the preferred antistatic agent is preferably a reaction product of epichlorohydrin and aliphatic primary monoamine or N-aliphatic hydrocarbyl alkylene diamine. A suitable polymeric polyamine is a 1:1.5 mole ratio reaction product of N-tallow-1,3-diaminopropane and epichlorohydrin. Such a compound is marketed under the name "POLYFLO 130" by Universal Oil Company.

Any sulfonic acid can be used. Suitable such acids include alkanesulfonic acid and alkarylsulfonic acid. A particularly suitable sulfonic acid is dodecylbenzenesulfonic acid. Petroleum sulfonic acids resulting from treating petroleum oil with sulfuric acid can also be used.

Suitable solvents include aromatic, paraffin and cycloparaffin compounds. In a copolymerization process in which one or more liquid comonomers are used, one of the liquid comonomers can be used as the solvent.

The antistatic agent most preferred for use in accordance with the process of the present invention consists of a composition comprising a mixture of from about 5% to about 15% by weight 1-decene polysulfone, from about 5% to about 15% by weight "POLYFLO 130", from about 5% to about 10% by weight dodecylbenzenesulfonic acid and from about 60% to about 88% by weight toluene. More specifically, the most preferred antistatic agent consists of 13.3% by weight 1-decene polysulfone, 13.3% by weight "POLYFLO 130", 7.4% by weight dodecylbenzenesulfonic acid and 66% by weight toluene. Such a composition is sold by DuPont under the trade name "Stadis 450". The 1-decene polysulfone preferably has an inherent viscosity of about 0.05 dl/g as determined by measuring a 0.5 weight percent solution of the polysulfone in toluene at 30° C.

As long as the antistatic agent is present in the polymerization zone and is able to contact the polymer particles directly during the polymerization process, the method by which it is added to the reactor is not critical. It can be added continuously or intermittently. In a batch process, it can all be added at one time, preferably prior to the introduction of the polymerization catalyst particles. Although the exact mechanism by which it functions is not clear, it is believed that the antistatic agent coats the polymer and/or copolymer particles and reduces the static charge thereof. In any event, the particles do not adhere to the reactor walls and do not agglomerate or fuse and form together in lumps when an antistatic agent is used.

Preferably, the antistatic agent is added to the polymerization zone by admixing it with a liquid and introducing the resulting mixture thereto. The liquid serves as a carrier for introducing the antistatic agent to the reactor. The liquid carrier used is preferably a hydrocarbon having a low boiling point. Most preferably, it is selected from the group consisting of pentane, n-butane, isobutane, and mixtures thereof. Isobutane is the most preferred of that group. If the preferred antistatic agent is diluted with a solvent, the same compound that is used as the solvent may also be used as the carrier. Thus, one compound can serve as both the solvent and carrier.

In a continuous process wherein copolymers are produced, a liquid comonomer can be used as the carrier. The antistatic agent is admixed with the comonomer and added to the polymerization zone therewith.

In a continuous process, essentially all of the liquid carrier vaporizes in the hot reactor. At least a portion of the antistatic agent is left on the reactor walls and is thereby able to contact the polymer particles directly during the polymerization process. The carrier vapors are carried out of the polymerization zone by the gas that continuously flows upwardly therethrough. If the liquid carrier used to add the antistatic agent to the polymerization zone is a liquid comonomer, the carrier or comonomer vapors react with the olefin gas flowing through the reactor and/or other comonomers in the reactor to form particles of copolymer. Any comonomer vapors that do not react are carried out of the polymerization zone with the gas passing therethrough.

In a batch polymerization process, the liquid carrier is preferably allowed to vaporize or flash in the polymerization zone. The resultant vapors are then flushed from the reactor. As in a continuous process, when the carrier used in a batch process flashes, a portion of the antistatic agent is left on the walls of the reactor and is thereby present with the polymer and/or copolymer particles during the polymerization process. The components in the polymerization zone are preferably stirred before the carrier is allowed to flash. The carrier vapors can be flushed out of the polymerization zone by the flow of gas through the reactor. For example, olefin gas can be passed through the reactor at a pressure sufficient to remove the carrier vapors without disturbing the other components in the polymerization zone.

The amount of antistatic agent added to the reactor is very important. The antistatic agent should be added in an amount sufficient to reduce adherence of the polymer and/or copolymer particles to the walls of the reactor and to prevent polymer buildup, but not in an amount that significantly reduces the rate of the reaction. Too much antistatic agent will poison or partially deactivate the catalyst. Many compounds that would otherwise function as suitable antistatic agents are too offensive to the catalyst and cannot be used at all. Only a very small amount of antistatic agent is necessary. Unless the agent is diluted, it cannot practically be added to the reactor.

In a batch process, the most preferred antistatic agent described above is preferably added to the polymerization zone in an amount in the range of from about 0.1% to about 2% by weight of the polymerization catalyst employed. Most preferably, the antistatic agent is added to the polymerization zone in an amount in the range of from about 0.2% to about 1.0% by weight of the catalyst employed. The amount of carrier admixed with the antistatic agent to introduce the antistatic agent to the polymerization zone is not critical, as long as it can be removed as described above.

In a continuous process, the antistatic agent is preferably added to the polymerization zone in an amount in the range of from about 0.1 to about 10 parts per million parts by weight of polymer and/or copolymer particles produced. Most preferably, the antistatic agent is added to the polymerization zone in an amount in the range of from about 0.2 to about 5 parts per million parts by weight of polymer and/or copolymer particles produced.

In order to illustrate and facilitate a clear understanding of the process of the present invention, the following example is given.

EXAMPLE

An antistatic agent was tested for its ability to prevent reactor fouling in a gas phase polymerization process. Ethylene was polymerized with a 1-hexene comonomer to produce an ethylene/ 1-hexene copolymer. The tests were conducted with and without the antistatic agent present.

In each test, polymerization was conducted in a 2-liter stainless steel jacketed autoclave equipped with a marine-type propeller rotating at 350 RPM. As the ethylene gas was consumed, it was supplied automatically to the reactor through a calibrated rotameter from a pressurized reservoir. Each polymerization was conducted at an ethylene partial pressure of approximately 175 psig. Hydrogen gas was also supplied at a partial pressure of approximately 50 psig. The temperature of the reaction in each test was approximately 79-83° C.

The antistatic agent used in each test was "Stadis 450", which consists of 66% by weight toluene, 13.3% by weight 1-decene polysulfone, 13.3% by weight polymeric polyamine and 7.4% by weight dodecylbenzenesulfonic acid. The antistatic agent was added to the polymerization zone by admixing it with a carrier consisting of isobutane or cyclohexane and adding the resulting mixture thereto. The mixture was added to the reactor in an amount sufficient to achieve the desired concentration of antistatic agent therein.

The reactor was initially heated to a temperature sufficient to cause the carrier to flash. The carrier vapors were then flushed out of the reactor with ethylene gas, leaving a small amount of the antistatic agent behind on the walls of the reactor.

The catalyst used in each test was a silica/titania/chromium oxide tergel obtained by simultaneously gelling silica, titania and chromium oxide. The tergel catalyst was activated at a temperature of approximately 870° C. It was charged to the reactor after the isobutane vapors were removed therefrom.

After the catalyst was charged to the reactor, the reactor was pressured to 50 psig with hydrogen gas, and ethylene gas flow into the reactor was started. The 1-hexene comonomer was then pumped into the reactor to create the desired concentration therein. The actual concentration of the 1-hexene comonomer in the reactor was frequently determined by gas chromatography on reactor samples. Polymerization began in each test after a few minutes. The heat of polymerization was removed by flowing a cooling liquid through the jacketed autoclave at a rate sufficient to maintain the indicated temperature. After the reaction was stopped, the uniform granular polymer was removed by opening the autoclave.

The results of these tests are summarized in Table I below. The results clearly show that reactor fouling was eliminated when a small amount of an antistatic agent was introduced to the reactor. With no antistatic agent present in the reactor, a substantial amount of fouling occurred. (See results from Tests I and II). The fouling also occurred when an insufficient amount of antistatic agent was used. (See results from Test IX). When too much antistatic agent was used, the rate of the reaction was reduced to some extent. (See results from Tests III, IV and V).

TABLE I

Ethylene/1-hexene Copolymerization

| Test No. | Antistatic Agent[1] Added ($\times 10^{-4}$ grams) | Catalyst Added (grams) | 1-hexene Added (Mole %)[2] | Polymer Yield (grams) | Reaction Rate (grams/grams/hr)[3] | MI[4] (grams/ 10 mins.)[5] | Density (grams/cc)[6] | Fouling Indication Lumps or Bands of Polymer Formed (grams) |
|---|---|---|---|---|---|---|---|---|
| I | 0 | 0.0252 | 1.1 | 103 | 4300 | 0.49 | 0.9389 | 12 (band) |
| II | 0 | 0.0208 | 1.8 | 80 | 3850 | 1.5 | 0.9270 | 13 (lumps) |
| III | 1.7 | 0.0330 | 2.0 | 138 | 3060 | 0.42 | 0.9370 | 0 |
| IV | 3.4 | 0.0334 | 2.3 | 146 | 2620 | 0.46 | 0.9300 | 0 |
| V | 3.4 | 0.0348 | 4.0 | 118 | 2910 | 2.4 | 0.9210 | 0 |
| VI | 1.0 | 0.0302 | 2.8 | 135 | 4190 | 2.0 | 0.9180 | 0 |
| VII | 0.8 | 0.0290 | 2.7 | 120 | 3550 | 2.4 | 0.9150 | 0 |
| VIII | 1.0 | 0.0265 | 2.3 | 152 | 6880 | 0.53 | 0.9300 | 0 |

TABLE I-continued

| | Ethylene/l-hexene Copolymerization | | | | | | | |
|---|---|---|---|---|---|---|---|---|
| | Antistatic | | | | | Polymer Properties | | Fouling Indication |
| Test No. | Agent[1] Added ( × 10⁻⁴ grams) | Catalyst Added (grams) | 1-hexene Added (Mole %)[2] | Polymer Yield (grams) | Reaction Rate (grams/grams/hr)[3] | MI[4] (grams/ 10 mins.)[5] | Density (grams/cc)[6] | Lumps or Bands of Polymer Formed (grams) |
| IX | 0.65 | 0.0330 | 2.1 | 132 | 4000 | 1.3 | 0.9258 | 20 (band) |

[1] "Stadis 450", trade name for composition sold by DuPont.
[2] Mole % of total olefin present.
[3] Grams of polymer produced per hour per grams of catalyst.
[4] Melt Index.
[5] Number of grams of polymer forced through a 0.0825 inch orifice in 10 minutes at 190° C. by a weight of 2160 grams.
[6] Grams per cubic centimeter.

Thus, the tests showed that an antistatic agent prevents fouling of the reactor in a gas phase polymerization process when admixed in a sufficient concentration with a liquid solution and added to the reactor therewith.

The preceding example can be repeated with similar success by substituting the generically or specifically described reactants and/or operating conditions of this invention for those used in the example.

From the foregoing description, one skilled in the art can easily ascertain the essential characteristics of this invention, and without departing from the spirit and scope thereof, can make various changes and modifications of the invention to adapt it to various usages and conditions. For example, one skilled in the art can use the process of the present invention to prevent reactor fouling in any type of gas phase polymerization process. The broad description of a particular gas phase polymerization process is provided merely to illustrate and facilitate a clear understanding of the process of this invention.

What is claimed is:

1. In a process in which comonomers are polymerized in the polymerization zone of a gas phase polymerization reactor in the presence of catalyst particles to produce copolymer particles, the improvement comprising admixing an antistatic agent with a liquid carrier comprising one of said comonomers, introducing the resulting mixture to said polymerization zone and allowing said liquid carrier to vaporize whereby at least a portion of said antistatic agent is present in said polymerization zone and is able to contact said copolymer particles directly during said process, said antistatic agent being compatible with said catalyst particles and being introduced to said polymerization zone in an amount sufficient to prevent fouling of said reactor.

2. In a gas phase polymerization process wherein comonomers are copolymerized in the polymerization zone of a gas phase polymerization reactor in the presence of catalyst particles to produce particles of copolymer, the improvement comprising admixing an antistatic agent with a comprising one of said comonomers, introducing the resulting mixture to said polymerization zone and allowing said liquid carrier to vaporize whereby at least a portion of said antistatic agent is present in said polymerization zone and is able to contact said polymer particles directly during said process, said antistatic agent being introduced to said polymerization zone in an amount sufficient to reduce adherence of said copolymer particles to the walls of said reactor and to reduce the tendency of said copolymer particles to agglomerate thereby preventing said reactor from fouling, said antistatic agent being a composition comprising a mixture of:
   a polysulfone copolymer;
   a polymeric polyamine;
   sulfonic acid; and
   a solvent.

3. In a gas phase polymerization process wherein comonomers are copolymerized in the polymerization zone of a fluidized bed polymerization reactor in the presence of catalyst particles to produce particles of copolymer, the improvement comprising admixing an antistatic agent with a liquid carrier comprising one of said comonomers, introducing the resulting mixture to said polymerization zone and allowing said liquid carrier to vaporize whereby at least a portion of said antistatic agent is present in said polymerization zone and is able to contact said copolymer particles directly during said process, said antistatic agent being introduced to said polymerization zone in an amount sufficient to reduce adherence of said copolymer particles to the walls of said reactor and to reduce the tendency of said copolymer particles to fuse and form together thereby preventing said reactor from fouling, said antistatic agent being a composition comprising a mixture of:
   1-decene polysulfone present in a concentration in the range of from about 5 to about 15 percent by weight of said composition;
   a 1:1:5 mole ratio reaction produce of N-tallow-1,3-diaminopropane and epichlorohydrin present in a concentration in the range of from about 5 to about 15 percent by weight of said composition;
   dodecylbenzenesulfonic acid present in a concentration in the range of from about 5 to about 10 percent by weight of said composition; and
   toluene present in a concentration in the range of from about 60 to about 88 percent by weight of said composition.

* * * * *

UNITED STATES PATENT AND TRADEMARK OFFICE
CERTIFICATE OF CORRECTION

PATENT NO. : 5,026,795
DATED : June 25, 1991
INVENTOR(S) : John P. Hogan

It is certified that error appears in the above-identified patent and that said Letters Patent is hereby corrected as shown below:

In Column 1, lines 34 and 35, delete "nitrogencontaining" and substitute --nitrogen-containing-- therefor (both occurrences); and Column 7, line 55, insert --liquid carrier-- between "a" and "comprising".

Signed and Sealed this

Sixth Day of October, 1992

Attest:

DOUGLAS B. COMER

Attesting Officer     Acting Commissioner of Patents and Trademarks